United States Patent [19]

Zandona

[11] 4,405,444

[45] Sep. 20, 1983

[54] METHOD AND MEANS FOR CHARGING FOAMED RESIDUAL OILS IN CONTACT WITH FLUID SOLID PARTICULATE MATERIAL

[75] Inventor: Oliver J. Zandona, Ashland, Ky.

[73] Assignee: Ashland Oil, Inc., Ashland, Ky.

[21] Appl. No.: 439,972

[22] Filed: Nov. 8, 1982

[51] Int. Cl.³ .................... C10G 9/28; C10G 11/00; C10G 11/14

[52] U.S. Cl. ................... 208/113; 208/127; 208/153; 208/157

[58] Field of Search ............... 208/113, 127, 153, 157

[56] References Cited

U.S. PATENT DOCUMENTS

| | | | |
|---|---|---|---|
| 2,944,960 | 7/1960 | Dickens | 208/127 |
| 2,994,659 | 8/1961 | Slyngstad et al. | 208/153 |
| 3,152,065 | 10/1964 | Sharp | 208/157 |
| 3,547,805 | 11/1969 | Mitchell | 208/48 |
| 3,654,140 | 4/1972 | Griffel | 208/113 |
| 3,812,029 | 5/1974 | Snyder | 208/113 |
| 4,097,243 | 6/1978 | Bartholic | 208/153 |

OTHER PUBLICATIONS

Bulletin TF-27 Tretolite Div. Petrolite Corp. MO 63119 63 Chem. Eng. Progress 41-47 Mech. of Foam Stab.

63 Chem. Engr. Progress 48-52 Sol'n of a Foam Prob., Mar. 4, 1968 Oil & Gas Journal-MEA Absorber Foam Prob.

Aug. 28, 1967 Oil & Gas Journal-Where ... Corrosion, Foaming.

Primary Examiner—Delbert E. Gantz
Assistant Examiner—Chung Pak
Attorney, Agent, or Firm—Richard C. Willson, Jr.

[57] ABSTRACT

Method to improve mixing water-and charge in a hydrocarbon conversion unit comprising foaming the charge with a foaming agent e.g. selected from the group consisting of sulfonates or polymer resins (preferably some oil soluble, some water soluble).

12 Claims, 2 Drawing Figures

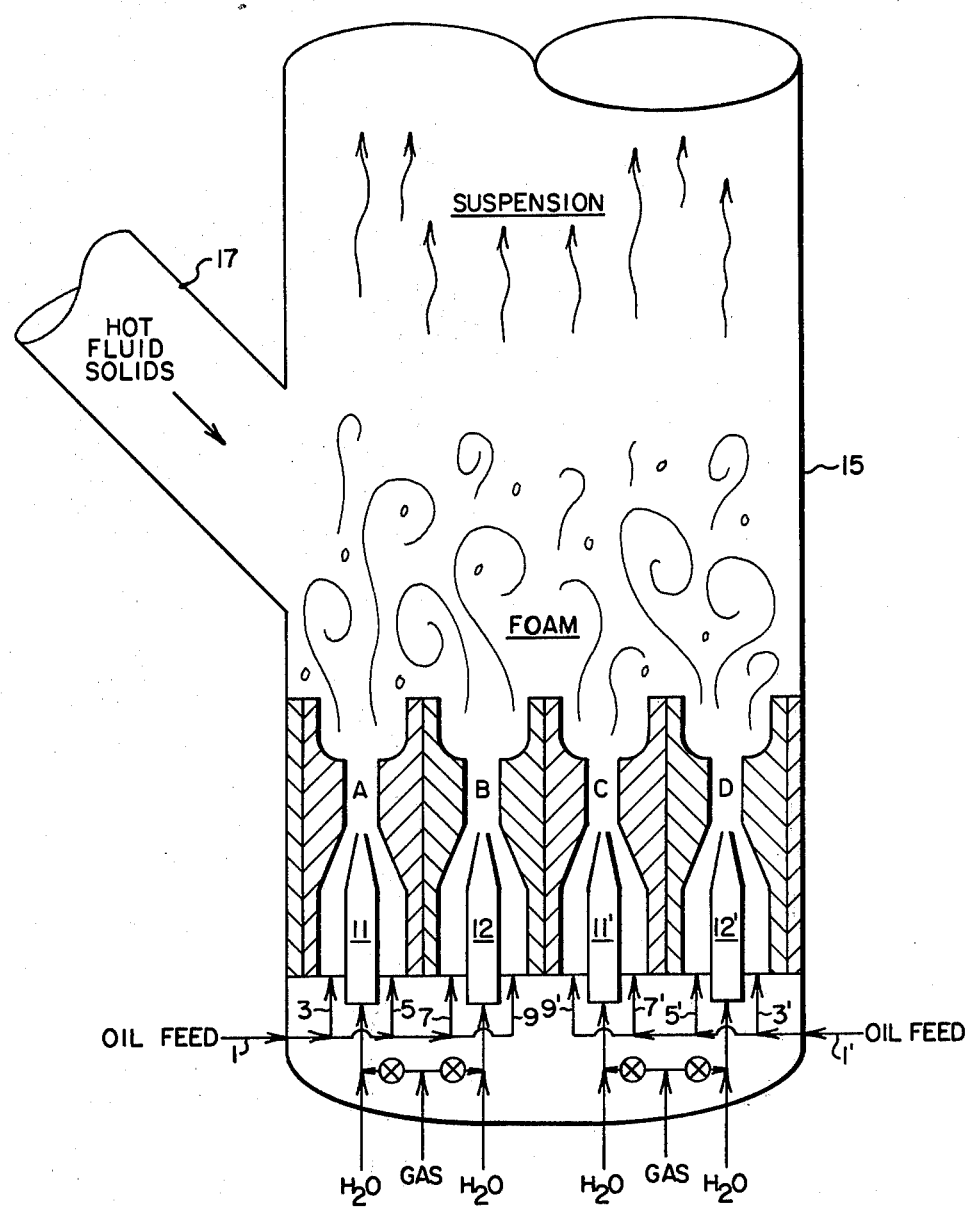

METHOD AND MEANS FOR CHARGING FOAMED RESIDUAL OILS IN CONTACT WITH FLUID SOLID PARTICULATE MATERIAL

This invention is concerned with the conversion of crude oil and fractions thereof comprising residual and reduced crude fractions thereof to form fuel products comprising gasoline, lower and higher boiling product fractions. In a particular aspect the present invention is concerned with identifying a method and means for foaming a residual oil or reduced crude fraction in the bottom portion of a riser cracking zone for obtaining intimate dispersed phase contact with hot fluidizable solid particles mixed therewith to form an upflowing suspension under thermal and/or catalytic cracking of the foamed oil feed material. More particularly the present invention is concerned with a technique for obtaining more intimate contact between high boiling hydrocarbons such as gas oils, residual oils, reduced crudes, topped crudes, whole crudes, portions of crude oils comprising metallo-organic compounds, shale oils, oil products of tar sands and oil products of coal conversion either alone or as mixtures thereof with finely divided fluidizable solids with or without cracking catalyst activity. The technique of interest particularly comprises the concept of foaming the oil feed material and mixing the foam with fluidizable solids at a temperature promoting desired conversion of the oil particles comprising the foam.

In the prior art of U.S. Pat. No. 3,547,805, a hydrocarbon oil feed is charged to a contact system by injecting it as an annular stream surrounding a stream of water to form an atomized oil feed mixed with steam.

U.S. Pat. No. 3,152,065 discloses a feed injector arrangement which includes an inner pipe for passing steam and an outer pipe forming an annulus with the inner pipe through which the oil feed is passed. This patent discloses placing curved stator blades in the annulus adjacent the end of the steam pipe to improve mixing.

U.S. Pat. No. 3,654,140 is directed to an oil feed injector design concurrently feeding steam to the injection zone in a volumetric ratio of steam to liquid hydrocarbons ranging from about 3 to 75 thereby imparting to the mixture an exit velocity relative to the catalyst particles of at least about 100 feet per second whereby the oil feed is substantially completely atomized at the nozzle exit forming droplets less than about 350 microns in diameter.

U.S. Pat. No. 3,812,029 contemplates a nozzle arrangement in which the outer tube is used to convey water as a temperature and flow rate lower than that of oil feed passed through a central coaxially aligned tube.

The prior art identifies in one form or another the need to obtain good mixing of oil feed and catalyst particles charged to the lower portion of a riser cracking zone whereby the intimacy of contact can be achieved in a time frame less than 10 seconds and more usually less than about 6 seconds. On the other hand where the contact time is preferably restricted to less than 4 seconds it is essential to obtain rapid dispersal and intimate contact between oil and catalyst particles contributing to more equal or uniform conversion of the oil feed components within a restricted riser conversion zone. It is known that improved mixing reduces gas make, increases gasoline selectivity and more importantly improves the effect of catalytic cracking in preference to thermal cracking where such is desired in addition to reducing carbon formation.

The oil feed dispersal concept of this invention and operating parameters are selected to ensure a relatively dispersed phase contact as distinguished from a dense bed contact between solid fluidizable particles and a foamed oil feed which will compliment achieving rapid vaporization and intimate hydrocarbon conversion in a riser conversion zone under operating parameters of temperature and contact time selected to achieve a desired result.

SUMMARY OF THE INVENTION

The present invention is concerned with the conversion of heavy oil fractions generally boiling above naphtha and referred to in the literature as topped crudes, reduced crudes, residual oils, fractions of crude oil boiling above about 204° C. (400° F.) and comprising atmospheric and vacuum gas oils with or without the presence of materials generally boiling above about 552° C. (1025° F.). Material boiling above 552° C. (1025° F.) is referred to as resid or vacuum bottoms comprising asphaltenes or as comprising metallo-organic compounds or carbo-metallic compounds including porphyrins and high boiling multi-ring compounds of at least 3 or more attached rings. Such residual oils or high boiling portions of crude oils may comprise up to 40 volume percent of material boiling above 552° C. (1025° F.) and comprising substantial Conradson carbon producing components, sulfur and nitrogen compounds as well as free or combined metal contaminants of iron, nickel, vanadium and copper.

In a more particular aspect the present invention is concerned with a thermal and/or catalytic conversion of a residual portion of crude oil such as a reduced crude. That is to say, the present invention is particularly concerned with the intimacy of contact obtained at relatively high conversion temperatures above 482° C. (900° F.) between very fine oil droplets and fluidizable solid particle material of a size within the range of about 10 microns up to about 150 or 200 micron particle size and of a size distribution providing an average particle size within the range of 60 to 90 micron particle size. The solid particle material employed in the method and apparatus of this invention may be a sorbent particle material of little or no cracking catalytic activity, an amorphous cracking catalyst or a crystalline zeolite containing cracking catalyst of relatively high or lower cracking activity depending on method of preparation and use thereof such as obtained with catalyst of equilibrium cracking activity for the system in which the catalyst is employed. Varying the crsytalline zeolite content of the catalyst between 0 and 40 weight percent materially alters its activity and life.

The problems associated with intimacy of contact between an oil feed material and fluidizable particles has been long felt and aggrevated substantially by the addition of 552° C. (1025° F.) plus material or a vacuum resid to a gas oil feed to be thermally and/or catalytically cracked. Under prior art conditions, a gas oil feed preheated up to about 427° C. (800° F.) is rapidly vaporized upon contact with hot catalyst particles recovered from a catalyst regeneration zone at a temperature within the range of 732° C. (1350° F.) up to about 871° C. (1600° F.) and more usually not above about 760° C. (1400° F.). However, as the resid or 552° C. (1025° F.) plus portion of the oil feed is increased, obtaining satisfactory and desired intimacy of contact between oil particles and fluid solid particles is greatly aggravated by non-vaporized components even though such intimacy is essential to efficient conversion of such high boiling materials.

In accordance with this invention the intimacy of contact between a reduced crude and solid particulate material, whether catalytic or non-catalytic, is obtained by charging the oil feed or reduced crude essentially as a foam to a riser reaction zone for contact with hot fluid particle material. In a particular embodiment the redisual oil or reduced crude is charged to the bottom portion of a riser cracking zone beneath the solid particle inlet thereto and through one or a plurality of feed nozzles comprising foam producing orifice restrictions in the riser cross section. The plurality of nozzles may be provided in a flat or curved plate or baffle member in the riser cross section. Thus the residual oil feed is expanded from 50 to 100/1 volumes to produce a foam which is intimately commingled immediately upon discharge from the nozzle with introduced hot fluidizable solid particles to form a high temperature suspension thereof which is rapidly vaporized and caused to flow upwardly through the riser reactor. Thus by the method and technique of this invention much less of the riser length is required to complete the desired highly efficient intimacy of contact between oil feed and solids essential for efficient thermal and/or catalytic conversion of the charged high boiling crude oil feed.

It is desirable within the operating parameters of this invention to charge a preheated oil feed converted to a foam before contact with fluid solid particulate material which has been preheated by combustion of carbonaceous deposits to an elevated temperature within the range of 704° C. (1300° F.) up to about 815° C. (1500° F.) and more usually not above about 760° C. (1400° F.). Thus the concentration of solids or catalyst particles in the suspension flowing upwardly through the riser with vaporized product of introduced foam may be within the range of 5 to 30 pounds of solids per cubic foot of riser and of a concentration and temperature sufficient to restrict the suspension temperature at the riser outlet within the range of 454° to 593° C. (850° to 1100° F.) and more usually within the range of 510° to 566° C. (950° to 1050° F.) depending on whether a thermal visbreaking operation is being pursued or a catalytic cracking operation is being pursued. A catalytic conversion operation may be effected at temperatures equal to, above or below that employed for thermal conversion of a residual or reduced crude feed.

The method for foaming the residual oil or reduced crude oil feed may be accomplished by one or several different operating techniques and combination thereof. That is, foaming agents may be added such as sulfonates, polymers and resins to the oil feed which are either oil or water soluble. On the other hand, the residual oil may be foamed by preheating to a temperature within the range of 149° to 316° C. (300° to 600° F.) and preferably at least 204° C. (400° F.) before adding liquid water thereto to form a foam dispersed in the lower portion of the riser reactor. it is advantageous to use sour water condensate recovered at a temperature of at least 38° C. (100° F.) from the main column overhead for this purpose since heating of the sour water recovered at a temperature of at least 38° C. (100° F.) may not be required and the presence of sulfurous material may contribute to foaming the oil feed. It is found that when liquid water is brought in contact with a reduced crude preheated to at least 204° C. (400° F.) foaming of the residual oil begins and when a low velocity purge gas such as product dry gas, steam or other gaseous material is used in passing the mixture through an optimum orifice restriction comprising a nozzle system suitable for the purpose, foamed reduced crude of desired characteristics is achieved. The concept of this invention contemplates pressuring the residual oil feed to pressure within the range of atmospheric pressure up to about 200 psig but more usually not above about 50 or 100 psig before preheating the feed to a temperature within the range of 204° to 427° C. (400° to 800° F.) and more usually not above about 316° C. (600° F.). Liquid water, such as sour water is added to the preheated feed whereupon formation of foam is initiated with or without the presence of added surfactant materials to reduce surface tension of the oil feed being foamed. Foaming of the oil feed is further enhanced by passing the oil-water mixture through a restricting orifice providing relatively high velocities up to and including sonic velocities. It will be recognized by those skilled in the art that the conditions for foaming various feeds will vary and such variations to the extent need are a part of the technique and operating concepts of this invention.

The produced residual oil foam is added to a riser conversion zone either above or below the inlet of hot fluidizable solids thereto. That is, it is contemplated providing a foam producing multiple orifice plate means in the riser cross section beneath the solids inlet to the riser so that the charged solids can sweep feed. On the other hand, the oil foaming device or nozzle means can be provided in multiple arrangement about the riser periphery discharging into the riser so that rising fluid solids will be intimately commingled therewith into an intimate rising suspension of dispersed solids and oil particles or droplets at an elevated conversion temperature. The suspension thus formed may be restricted to a riser discharge temperature within the range of 427° to 649° C. (800° to 1200° F.) and more usually below 593° C. (1100° F.) depending on whether thermal or catalytic conversion of the oil feed is being achieved.

BRIEF DESCRIPTION OF THE DRAWINGS

FIG. I is a diagrammatic sketch in elevation of a side-by-side system for achieving regeneration of solids used and recovered from a riser contact zone and an adjacent riser zone for achieving contact between fluidizable solids and oil feed charged as a foam.

FIG. II is a diagrammatic sketch of a system for foaming residual oil comprising a simple feed nozzle arrangement used therewith. A plurality of such nozzle arrangements may be dispersed in a riser reactor cross section and charged with oil feed in a manner shown by either FIG. I or FIG. II. Other arrangements suitable for the purpose may also be employed.

DISCUSSION OF SPECIFIC EMBODIMENTS

Figure 1:
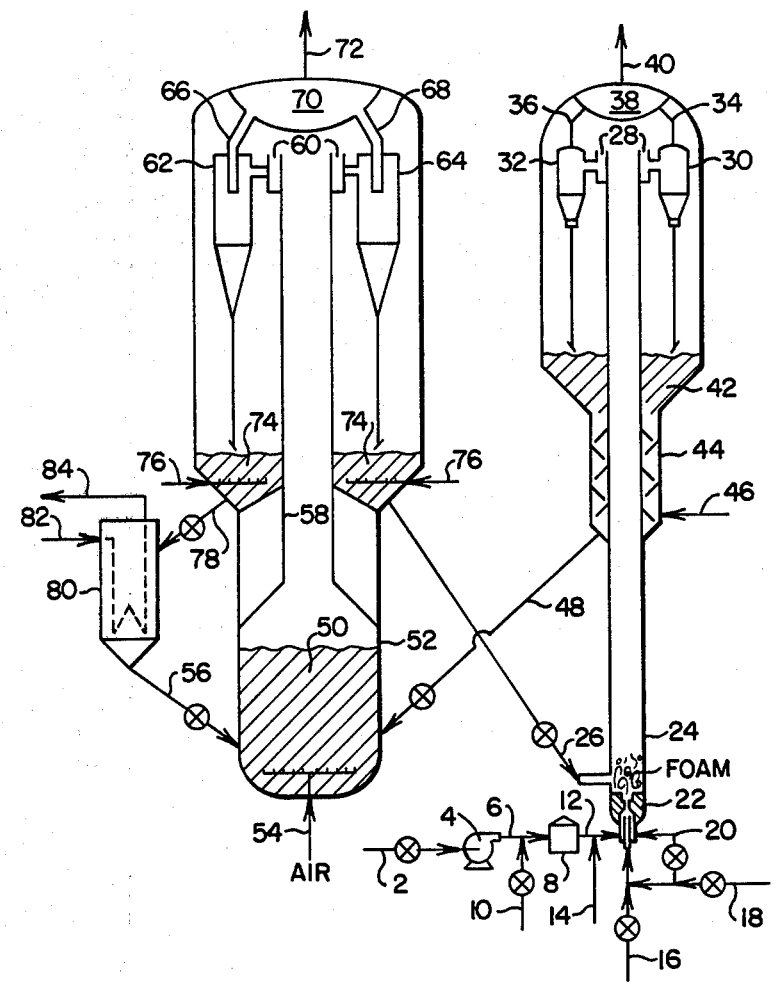

One of the major goals to be accomplished in a reduced crude cracking operation is concerned with optimizing the dispersion contact with oil feed droplets and fluid solid particles less than 100 microns generally at the base or lower bottom portion of a riser contact zone of restricted diameter to length ratio. A solution proposed by the present invention to accomplish improved intimacy of contact is to expand the oil feed such as a reduced crude feed by foaming with water to which a carrier gas may or may not necessarily be added. The carrier gas may be selected when needed from a number of different materials such as a steam, dry gas, nitrogen, carbon dioxide, wet recycle gas or other suitable gaseous materials. When foaming the residual oil or reduced crude feed it is intended to expand the oil feed by at least 50 volumes up to about 100 volumes as herein provided to provide a desired foamed feed material. Preferably the expanded oil feed is discharged into the riser as a mass of foam which is mixed intimately with charged hot solids in a solids to oil weight ratio particularly promoting the intimacy of contact desired and vaporization of the charged oil feed.

Experimental work contributing to the concept of the present invention is associated with numerous runs completed to develop the following. Several experiments comprising numerous individual runs were completed with foam producing equipment of the order identified in the figures. In the experiments foam quality is measured by the expansion ratio achieved between the volume of oil charged and the volume of foam produced. Foam expansions in the range of 20 to 139 were achieved. In one experiment identified as a first experiment, the amount of nitrogen purge gas for a preselected feed ratio of 330 g/min. coupled with 12.1 weight percent of water was determined. Foam make was very good between 10 and 20 scfh and the best was achieved with a run made at 15 scfh of nitrogen purge gas. Foam production stopped at a gas purge level of about 8 scfh.

In a second group of experiments using from 5 to 20 scfh of nitrogen purge, the amount of water employed was varied. This series of experiments confirmed that foam was achieved when using 12.1 weight percent of water and 15 scfh of purge gas. An expansion ratio of 37/1 was achieved. However, when using 10 scfh and 12.1 weight percent of water an expansion of 53/1 ratio was achieved. An experiment using 15 scfh purge gas in combination with 12.1 weight percent water charged to oil feed preheated to 260° C. (500° F.) produced excellent foamed product. Expansion ratio up to 190/1 were obtained in the experiments conducted.

The initial experiments above reported were completed with a relatively poor quality reduced crude comprising a metals content of about 250 ppm Ni+V. Feed properties such as API gravity, viscosity, surface tension and content of metallo-organic compounds are expected to effect the quality of foam produced and extent of expansion. An oil soluble foaming agent stable at a temperature up to 316° C. (600° F.) belongs to the class of fluorinated alkyl ester compounds. A particularly suitable purge gas for use in a commercial operation includes dry gas, wet gas and light gaseous hydrocarbons.

Referring now to FIG. I by way of example, there is shown a side-by-side riser reactor-solid particle regeneration system suitable for processing residual oils as herein provided. In this processing system, the solids may be fluidizable catalyst particles or solid sorbent particles of little or no catalytic cracking activity. A residual oil such as a topped crude or one of the oil feeds above identified is charged to the process by conduit 2 to pump 4 and thence by conduit 6 to a furnace 8 wherein the pressured oil feed is preheated to an elevated temperature in the range of 204° to 316° C. (400° to 600° F.) and most usually at least 260° C. (500° F.). The preheated oil feed is withdrawn from furnace 8 by conduit 12. Cold liquid water may be added by conduit 14 to initiate foaming of the oil charge before introduction to the foam producing nozzle discussed below.

The preheated oil in one specific embodiment is charged to the annulus of a foam forming nozzle for commingling with liquid water charged to the nozzle by conduit 16. Purge gaseous material is added by conduit 18 to the water in conduit 16 and/or separately added to the annulus by conduit 20. The heated oil feed, water and purge gas meet prior to flowing through an orific restriction 22 in the foam producing nozzle and thence through an expanded opening before discharge as a foam into the bottom of the riser reactor. It is to be understood that a plurality of such nozzle arrangements may be employed to provide the oil charge rate desired in place of the diagrammatic showing of one such nozzle in riser 24 of FIG. I. Solid particle material is charged to the riser by conduit 26 at a desired elevated temperature within the range of 677° C. (1250° F.) up to about 815° C. (1500° F.). The solids may be charged perpendicular to the riser so that they sweep across the nozzle outlet for admixture with introduced foam to form an intimate suspension mixture of fluidizable solid particles and foamed oil droplets and vaporous products thereof.

The suspension formed in riser 24 passes upwardly through the riser 24 for discharge from the upper end thereof after a residence time within the range of 1 to about 6 seconds. Separation of the suspension is preferably accomplished by the techniques of ballistic separation which depends in substantial measure upon the momentum differential between solid particle material and vaporous material. Vaporous material passes into a cup 28 open in its upper end and about the upper open end of riser 24 and thence into cyclone separating means 30 and 32. The flow of vaporous material into the cup and cyclone separators may be enhanced by providing a small pressure drop in the vaporous product recovery system. Vaporous products of conversion are recovered from cyclones 30 and 32 by conduits 34 and 36 respectfully which communicate with plenum 38 and withdrawal conduit 40 for transfer to the main column product fractionator not shown.

Solid particle material separated by ballistic separation and the cyclone separators is collected as a bed of solids 42 moved downwardly through a stripping zone 44 countercurrent to stripping gas introduced by conduit 46. The stripping gas employed may be selected from one of steam, $CO_2$, dry gas and mixtures thereof. Stripped solid particles then pass by conduit 48 to a dense fluid bed of solids 50 in the lower portion of a regeneration zone 52. Regeneration gas such as air or another oxygen rich gas is charged by conduit 54 to the lower portion of bed 50 wherein carbonaceous material deposited on the solids during contact with oil feed is removed by combustion. Recirculated solids may be added to bed 50 by conduit 56 as a means of temperature control by adding either hot or cool solids.

In the regeneration system of FIG. I, the solids either partially or completely regenerated and at an elevated temperature in the range of about 732° to 815° C. (1350° to 1500° F.) pass overhead from bed 50 for passage through an elongated restricted riser regeneration zone wherein heat transfer between solids and flue gas combustion products is promoted with or without combustion of formed carbon monoxide during regeneration of the solids. Thus when employing a CO combustion promotor with the solids as disclosed in the prior art, little combustion supporting amounts of CO are present in the flue gases passing upwardly through riser section 58. A suspension comprising combustion flue gases and solid particles following traverse of riser section 58 is separated by ballistic separation in a manner discussed above with respect to the hydro-carbon conversion riser reactor. The flue gases enter the upper open end of cup 60 about the upper open end of riser section 58 for passage to cyclone separators 62 and 64 respectively before withdrawal by conduits 66 and 68 into plenum chamber 70 for withdrawal by conduit 72. A particular advantage associated with the suspension separation techniques herein described includes the use of single stage long barrel cyclone separators in cooperation with the cup ballistic separation device to achieve adequate and desired separation of solid fines from gasiform materials whether it be regeneration flue gases or hydrocarbon vapors.

Solid particles of regeneration separated by the combination of ballistic separation and cyclone separation are recovered at an elevated temperature up to about 760° C. (1400° F.) or 815° C. (1500° F.) as an annular bed of solids 74 maintained in dense fluid bed condition by gaseous fluidizing material added by conduit 76. It is contemplated adding oxygen containing gas by conduit 76 complete the burn of residual carbon when desired and needed. A portion of the solids thus regenerated and at a temperature within the range of 704° C. to 815° C. (1300° F. to 1500° F.) are withdrawn for passage by conduit 26 to riser 24 as discussed above. Another portion of the solids comprising bed 74 are withdrawn by conduit 78 for passage to a cooler-steam generator 80 charged with boiler feed water by conduit 82. High or lower pressure steam may be recovered by conduit 84. Solids of a desired temperature are withdrawn from cooler 80 by conduit 56 as discussed above.

It is contemplated in another embodiment of using cooler 80 in stanpipe 26 passing solids to riser 24 and passing hot solids in conduit 78 directly to bed 50 in the absence of cooler 80.

FIG. II is provided to show one arrangement for including a plurality of foam producing nozzles in a lower or bottom cross sectioned area of the riser reactionz zone. In the arrangement of FIG. II four nozzle systems are shown. However, other multiple of nozzles may be employed up to about 10 nozzles. Furthermore, the bottom of the riser may be horizontally baffled to provide an oil inlet chamber in open communication with the annulus of each nozzle and separated from the coaxially aligned water addition conduit with purge gas. In the arrangemenbt of FIG. II, a plurality of orifice restriction A, B, C and D are charged with a mixture of preheated residual oil, cold water and purge gas in amounts and under velocity conditions promoting the formation of foam. Thus, preheated oil feed at a temperature up to about 314° C. (600° F.) is charged by conduit 1 and branch conduits 3, 5, 7 and 9 to the annulus of orifice restrictions A and B. Orifice restrictions C and D are similarly supplied with oil feed by conduites 1', 3', 5, 7' and 9'. Cool liquid water and gas are added to each of coaxially aligned tubes 11, 13, 11' and 13" provided with a relatively small discharge opening in the end thereof adjacent to the inlet of orifice restrictions A, B, C and D. The conditions of temperature, pressure and velocity at the orifice restrictions are selected which cause substantial foaming of the charged residual oil resembling shaving cream foam. The foam discharged from the plurality of nozzles into a lower bottom portion of riser 15 is commingled with hot solid particles charged by conduit 17 to form a suspension thereof for transfer upwardly through the riser as discussed with respect to FIG. I above.

It will be recognized by those skilled in the prior art that many different nozzle arrangements may be employed to accomplish the concept and results of this invention without departing from the scope thereof and such departures are considered to be a part of the present invention.

Having thus generally described the concepts of the present invention and discussed specific embodiments in support thereof, it is to be understood that no undue restrictions are to be imposed by reason thereof except as defined by the following claims.

What is claimed is:

1. A method for upgrading a high boiling portion of crude oil comprising metallo-organic and Conradson carbon producing compounds to form gasoline, lower and higher boiling hydrocarbon streams which comprises:
   A. charging a high boiling portion of crude oil as a thick foam to the lower portion of a riser conversion zone;
   B. charging fluidizable solid particle material at an elevated temperature in the range of 704° C. (1300° F.) up to about 815° C. (1500° F.) in intimate contact with said foamed oil feed to form a suspension thereof,
   C. passing said formed suspension through a riser conversion zone under conditions of restricted residence time and temperature promoting desired conversion of the oil feed, and
   D. recovering a hydrocarbon conversion product separated from catalyst particles following traverse of said riser conversion zone.

2. The method of claim 1 wherein the solid particle material is either a cracking catalyst or has little if any cracking activity.

3. The method of claim 1 wherein the high boiling portion of crude oil is a residual oil or reduced crude comprising components boiling above 552° C. (1025° F.).

4. The method of claim 1 wherein the high boiling oil feed comprises up to 40 volume percent of vacuum resid.

5. The method of claim 1 wherein the charged oil foam is prepared by contacting preheated oil feed and liquid water with a purge gas in an orifice restriction under conditions particularly promoting the formation of thick oil foam.

6. The method of claim 1 wherein separation of the suspension following traverse of the riser conversion zone is by ballistic separation in cooperation with a single stage cyclone separator, the hydrocarbon conversion products are separated as vaporous products from solid particles comprising carbonaceous products of hydrocarbon conversion and separated solid are contacted with a stripping gas.

7. The method of claim 6 wherein separated solid particles comprising carbonaceous deposits are regenerated by combustion of carbonaceous deposits with an oxygen containing gas during flow through one or more contact zones comprising dense and dispersed phase contact with combustion promoting gaseous material.

8. The method of claim 7 wherein separation of a dispersed phase of solids in transporting flue gases is accomplished by ballistic separation permitting the use of single stage cyclone separation in combination therewith.

9. The method of claim 1 wherein foaming of the oil feed is accomplished at velocities up to and including sonic velocities.

10. The method of claim 1 wherein the oil feed is expanded from 50 to 100 volume of foam per volume of oil feed.

11. The method of claim 5 wherein a water stream obtained from the product fractionator and a gaseous stream selected from product dry gas, product wet gas, $CO_2$ and light gaseous hydrocarbons is used as a purge gas in the production of oil foam.

12. A method for upgrading a reduced crude comprising metallo-organic compounds which comprises, A. heating said reduced crude to a temperature within the range of 204° C. to 316° C. (400° F. to 600° F.), B. passing the heated reduced crude at an elevated pressure up to about 100 psig admixed with liquid water and a purge gas through an orifice restriction causing substantial foaming of said reduced crude feed, C. contacting said foamed reduced crude with hot fluidizable solid particle to form a suspension thereof traversing an elongated confined reaction zone, and D. recovering a conversion product of said suspension following traverse of said reaction zone separate from solid particles.

* * * * *